(12) United States Patent
Kim et al.

(10) Patent No.: US 12,221,012 B2
(45) Date of Patent: Feb. 11, 2025

(54) BATTERY UNIT FOR VEHICLE AND UNDERBODY OF VEHICLE INCLUDING THE SAME

(71) Applicants: Hyundai Motor Company, Seoul (KR); Kia Corporation, Seoul (KR)

(72) Inventors: Sang Wan Kim, Busan (KR); Kyung Ho Kim, Gyeonggi-do (KR); Hyeon Su Jin, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 588 days.

(21) Appl. No.: 17/537,118

(22) Filed: Nov. 29, 2021

(65) Prior Publication Data

US 2022/0080857 A1 Mar. 17, 2022
US 2022/0332218 A9 Oct. 20, 2022

Related U.S. Application Data

(63) Continuation-in-part of application No. 16/827,604, filed on Mar. 23, 2020, now Pat. No. 11,235,670.

(30) Foreign Application Priority Data

| Oct. 4, 2019 | (KR) | ......................... | 10-2019-0123264 |
| Nov. 30, 2020 | (KR) | ......................... | 10-2020-0164466 |

(51) Int. Cl.
*B60K 1/04* (2019.01)
*B60L 50/60* (2019.01)
*B60L 58/26* (2019.01)

(52) U.S. Cl.
CPC ................ *B60L 58/26* (2019.02); *B60K 1/04* (2013.01); *B60L 50/66* (2019.02)

(58) Field of Classification Search
CPC ........... B60L 58/26; B60L 50/66; B60K 1/04; H01M 10/613; H01M 10/66
See application file for complete search history.

(56) References Cited

U.S. PATENT DOCUMENTS

| 4,365,681 A | 12/1982 | Singh |
| 5,385,793 A | 1/1995 | Tiedemann et al. |

(Continued)

FOREIGN PATENT DOCUMENTS

| DE | 10 2015 000578 A1 | 7/2016 |
| EP | 2199133 A2 | 6/2010 |

(Continued)

OTHER PUBLICATIONS

Notice of Allowance issued on Aug. 17, 2023 in U.S. Appl. No. 17/522,712.

(Continued)

*Primary Examiner* — Jason D Shanske
*Assistant Examiner* — James J Triggs
(74) *Attorney, Agent, or Firm* — Fox Rothschild LLP

(57) ABSTRACT

A battery unit for a vehicle is provided and includes a lower case having two battery compartments arranged in a direction toward opposite sides of the vehicle, respectively, and a connecting portion bent to be convex upwardly between the two battery compartments. Battery modules are installed in the two battery compartments, respectively. A cooling block is disposed under each of the battery modules and receives and discharges coolant to cool the battery module. An upper case is installed on the lower case and has a coolant inlet port through which the coolant is supplied to the cooling block and a coolant outlet port through which the coolant is discharged from the cooling block.

16 Claims, 16 Drawing Sheets

(56) References Cited

U.S. PATENT DOCUMENTS

| | | | |
|---|---|---|---|
| 5,390,754 | A | 2/1995 | Masuyama et al. |
| 5,456,994 | A | 10/1995 | Mita |
| 5,585,204 | A | 12/1996 | Oshida et al. |
| 6,632,560 | B1 | 10/2003 | Zhou et al. |
| 7,638,233 | B2 | 12/2009 | Vettoretti et al. |
| 8,967,312 | B2 | 3/2015 | Yanagi |
| 9,444,124 | B2 | 9/2016 | Beltz et al. |
| 9,499,205 | B1 | 11/2016 | Elia et al. |
| 9,925,890 | B2 | 3/2018 | Enning et al. |
| 11,165,109 | B2 * | 11/2021 | Ohkuma ............ H01M 10/6554 |
| 11,932,097 | B2 | 3/2024 | Kim et al. |
| 2004/0033415 | A1 | 2/2004 | Chen et al. |
| 2009/0139781 | A1 | 6/2009 | Straubel |
| 2010/0244557 | A1 * | 9/2010 | Ito ..................... F02N 11/0803 307/9.1 |
| 2011/0318626 | A1 | 12/2011 | Bartenschlager |
| 2012/0301765 | A1 | 11/2012 | Loo et al. |
| 2012/0312612 | A1 | 12/2012 | Harrison, III et al. |
| 2012/0312614 | A1 | 12/2012 | Fujiwara et al. |
| 2012/0321927 | A1 | 12/2012 | Loo et al. |
| 2013/0248264 | A1 | 9/2013 | Matsuda et al. |
| 2014/0060944 | A1 | 3/2014 | Fillion et al. |
| 2014/0370367 | A1 | 12/2014 | Higuchi et al. |
| 2015/0107921 | A1 | 4/2015 | Naruke |
| 2015/0295287 | A1 | 10/2015 | Schnaars et al. |
| 2016/0294025 | A1 | 10/2016 | Choi et al. |
| 2018/0326933 | A1 * | 11/2018 | Pahisson ............ B60R 16/0215 |
| 2020/0108690 | A1 | 4/2020 | Tan et al. |
| 2022/0158267 | A1 | 5/2022 | Kim |
| 2022/0348094 | A1 | 11/2022 | Pan et al. |

FOREIGN PATENT DOCUMENTS

| | | |
|---|---|---|
| JP | 2013-193706 A | 9/2013 |
| KR | 10-2011-0051694 A | 5/2011 |
| KR | 10-2012-0114638 A | 10/2012 |

OTHER PUBLICATIONS

Office Action issued Apr. 22, 2024 in corresponding Korean Patent Application No. 10-2019-0123264.

Non-Final Office Action issued on Apr. 12, 2023 in U.S. Appl. No. 17/522,213.

Non-Final Office Action issued Sep. 18, 2024 in U.S. Appl. No. 18/437,680.

* cited by examiner

BATTERY UNIT FOR VEHICLE AND UNDERBODY OF VEHICLE INCLUDING THE SAME

CROSS REFERENCE TO RELATED APPLICATION

The present application is a Continuation-in-part of application Ser. No. 16/827,604 filed on Mar. 23, 2020. Also, the present application claims priority to Korean Patent Application No. 10-2020-0164466, filed Nov. 30, 2020, the entire contents of which is incorporated herein for all purposes by this reference.

BACKGROUND

1. Technical Field

The present disclosure relates to a battery unit for a vehicle and an underbody of the vehicle including the same, and more particularly, to a battery unit having a structure to be installed under a center floor of a vehicle and an underbody of the vehicle on which the battery unit is installed.

2. Description of the Related Art

An electrically driven vehicle that is driven using an electric motor, such as a hybrid vehicle, a fuel cell vehicle, or an electric vehicle, includes a high voltage battery unit that stores driving power to be provided to the electric motor. The high voltage battery unit generally includes a case that forms a sealed internal space for a battery and a plurality of battery cells, and may also include a battery management system (BMS) configured to monitor voltages, currents, temperatures, and the like of battery modules installed in the sealed internal space of the case and battery cells in the battery modules, and perform control for managing the battery based thereon.

In addition, as a way of installing a high voltage battery module in the electrically driven vehicle, the high voltage battery unit is mounted in a trunk or a luggage compartment of the vehicle or mounted and fixed under a center floor of a vehicle body outside the vehicle. When the high voltage battery unit is mounted in the trunk or the luggage compartment of the vehicle, since the trunk or the luggage compartment of the vehicle is reduced, it is difficult to mount other components required for the vehicle such as spare tires, and it is also difficult to mount a third-row seat or implement a full flat seat utilizing the luggage space in a sport utility vehicle (SUV) or a multi-purpose vehicle (MPV).

When the high voltage battery unit is mounted under the center floor of the vehicle, it is possible to maximize the utilization of the trunk or the luggage compartment in the vehicle, but it is difficult to secure a space for disposing a propeller shaft for transmitting power from a power train (an engine and a motor), which is mounted at the front of the vehicle, to a rear wheel. Thus, when the high voltage battery unit is installed under the center floor outside the vehicle, it is necessary to mount a separate motor for driving the rear wheel to implement an all-wheel drive (AWD) operation. Particularly, it is not possible to increase a size of the motor for driving the rear wheel because of the limited installation space, resulting in a disadvantage in terms of power performance.

The contents described as the related art have been provided only to assist in understanding the background of the present disclosure and should not be considered as corresponding to the related art known to those having ordinary skill in the art.

SUMMARY

An object of the present disclosure is to provide a battery unit for a vehicle having a structure capable of transmitting power from a power train, which is provided at the front of the vehicle, to a rear wheel, while being installed under a center floor outside the vehicle, and an underbody of the vehicle including the same.

According to an exemplary embodiment of the present disclosure, a battery unit for a vehicle may include: a lower case having two battery compartments arranged in a direction toward opposite sides of the vehicle, respectively, and a connecting portion bent to be convex upwardly between the two battery compartments; battery modules installed in the two battery compartments, respectively; a cooling block disposed under each of the battery modules and receiving and discharging coolant to cool the battery module; and an upper case installed on the lower case and having a coolant inlet port through which the coolant is supplied to the cooling block and a coolant outlet port through which the coolant is discharged from the cooling block.

One coolant inlet port may be formed in an area corresponding to each of the battery compartments, and one coolant outlet port may be formed in an area corresponding to each of the battery compartments. The battery unit may further include a first hose connected to the coolant inlet port formed in the upper case and a second hose connected to the coolant outlet port formed in the upper case. The lower case may further include hose fixers to which first ends of the first hose and the second hose are fixed, respectively, outside an area covered by the upper case.

At the hose fixers, the first hose may be connected to a coolant introducing hose through which the coolant is introduced from another component in the vehicle, and the second hose may be connected to a coolant discharging hose through which the coolant is discharged to another component in the vehicle. The lower case may include at least one bracket for fixing a hose through which the coolant flows on an outer side surface thereof The battery unit may further include at least one member fixed to an area from a bottom surface to the outer side surface of the lower case to fix the battery unit under the vehicle, and the hose fixed to the bracket may be disposed at a position higher than an uppermost end of the member. A cell management unit configured to monitor and manage a voltage or a temperature of a battery cell included in each of the battery modules may be disposed on one side surface of the battery module, and the battery module may be disposed such that the cell management unit faces the connection portion.

The battery unit may further include a relay unit disposed between the battery module disposed in one of the battery compartments and the connecting portion to form or block an electrical connection between the battery unit and another system of the vehicle. The battery unit may further include a battery management unit configured to monitor and manage a current, a voltage, or a temperature of the battery unit and a fuse blocking an electrical connection between the two battery modules when an overcurrent occurs, and the battery management unit and the fuse may be disposed on the battery module disposed in one of the battery compartments.

According to another exemplary embodiment of the present disclosure, an underbody of a vehicle may include: a center floor of the vehicle; and a battery unit having: a lower case disposed under the center floor, having two battery compartments arranged in a direction toward opposite sides of the vehicle, respectively, and a connecting portion bent to be convex upwardly between the two battery compartments, and forming an installation space under the connecting portion between the two battery compartments; battery modules installed in the two battery compartments, respectively; a cooling block disposed under each of the battery modules and receiving and discharging coolant to cool the battery module; and an upper case installed on the lower case and having a coolant inlet port through which the coolant is supplied to the cooling block and a coolant outlet port through which the coolant is discharged from the cooling block, wherein a propeller shaft of the vehicle is disposed in the installation space.

DETAILED DESCRIPTION

Figure 1:
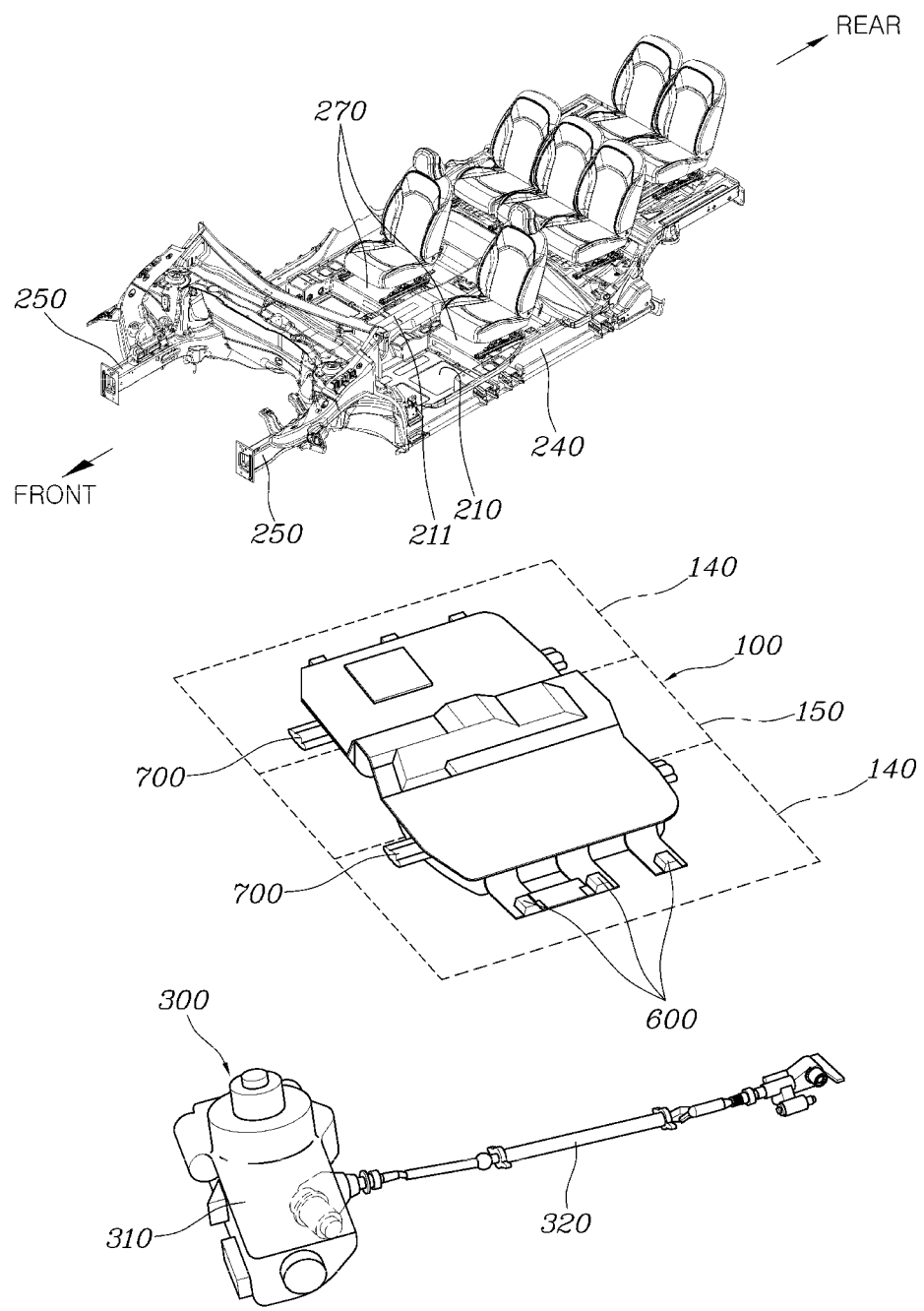
FIG. 1 is an exploded perspective view illustrating a battery unit according to an embodiment of the present disclosure and peripheral vehicle components thereof
Figure 2:
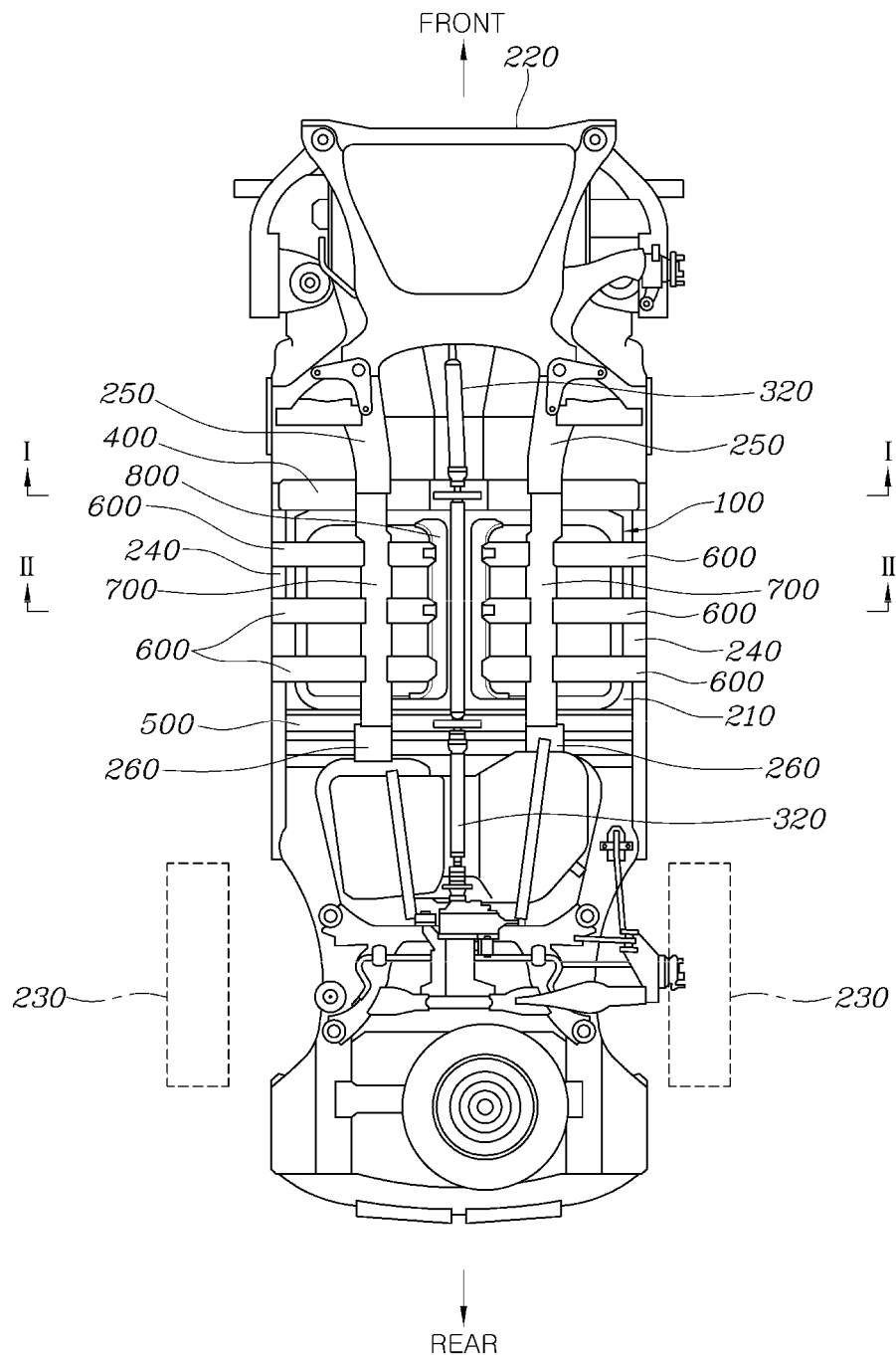
FIG. 2 is a bottom view of the components illustrated in FIG. 1 in an assembled state.
Figure 3:
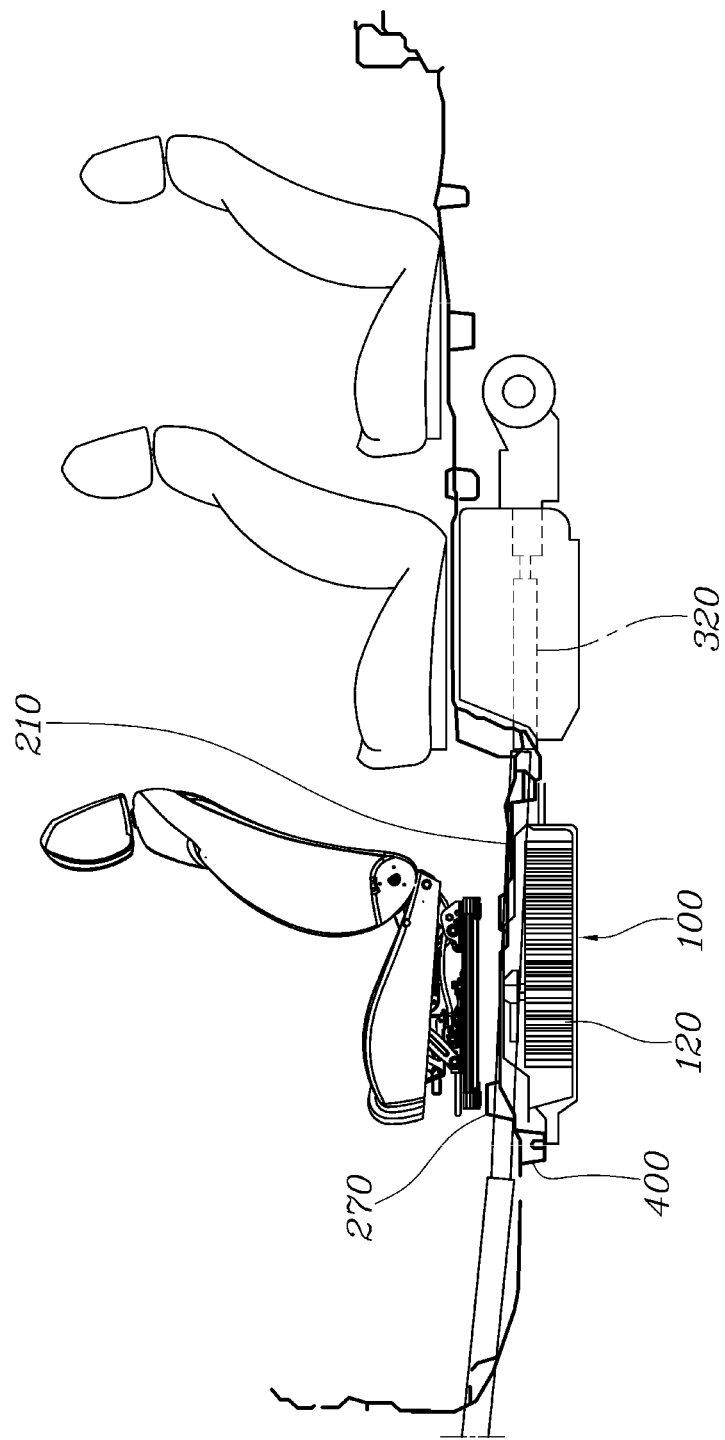
FIG. 3 is a side view of the components illustrated in FIG. 1 in an assembled state.
Figure 4:
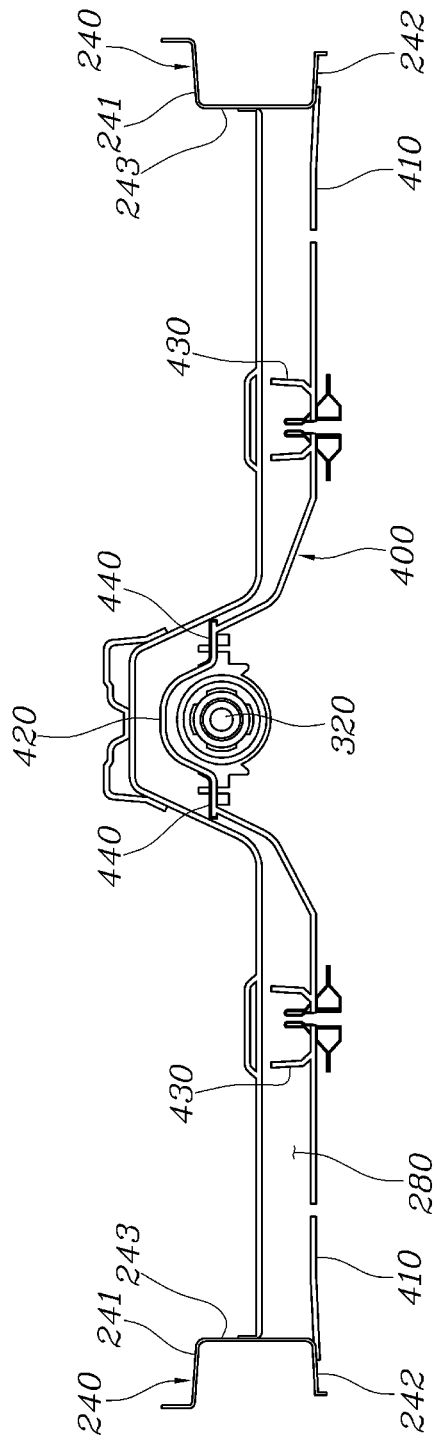
FIGS. 4 and 5 are cross-sectional views taken along lines I-I and II-II of FIG. 2, respectively.
Figure 5:
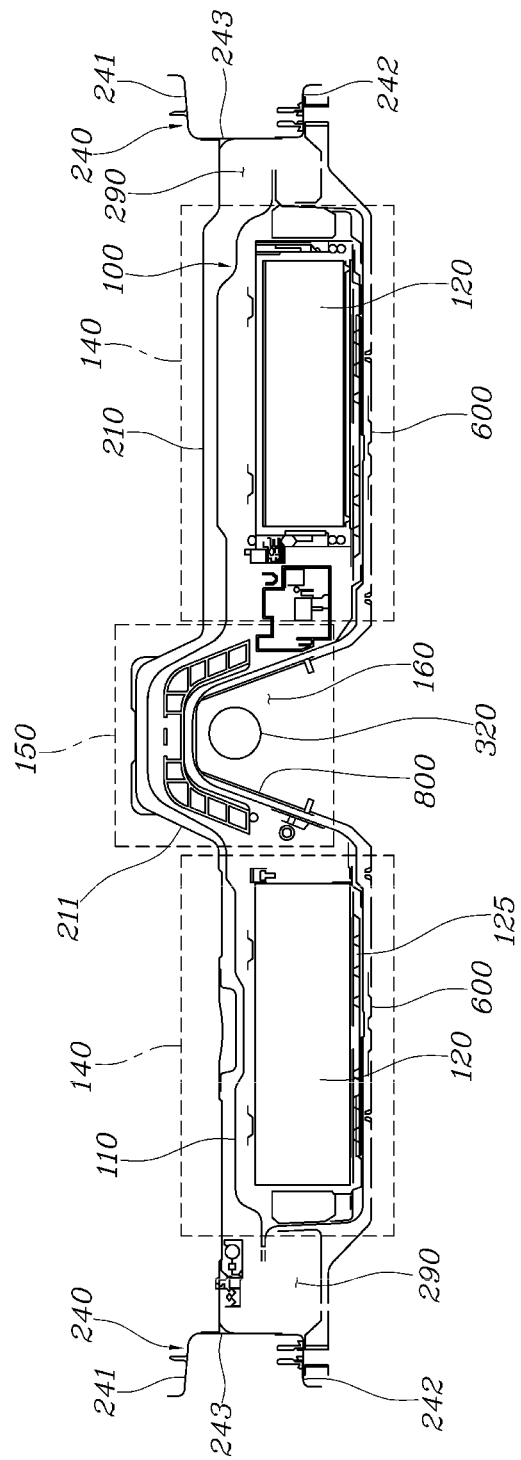
Figure 6:
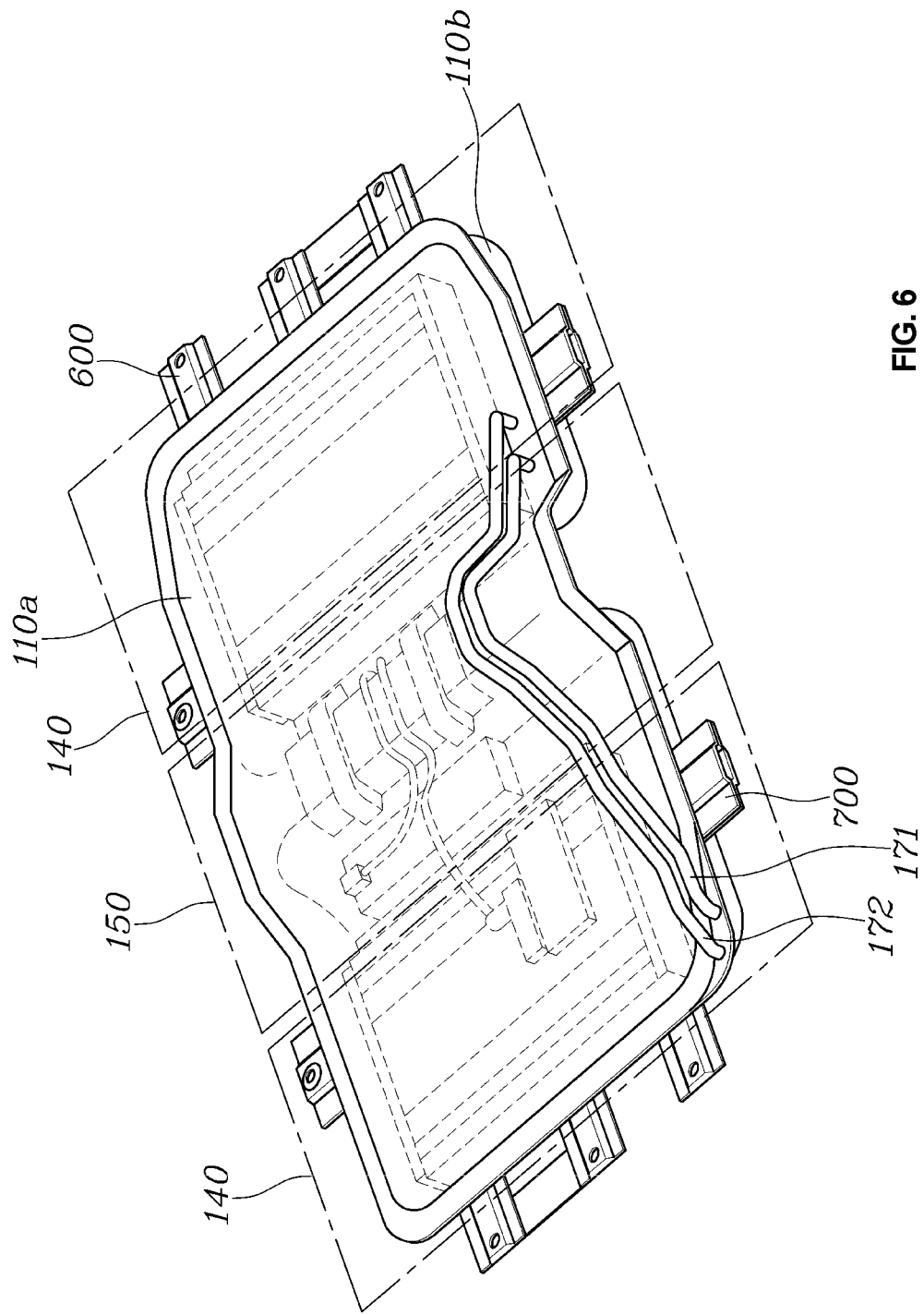
FIG. 6 is a perspective view of the battery unit according to an embodiment of the present disclosure when viewed from above.
Figure 7:
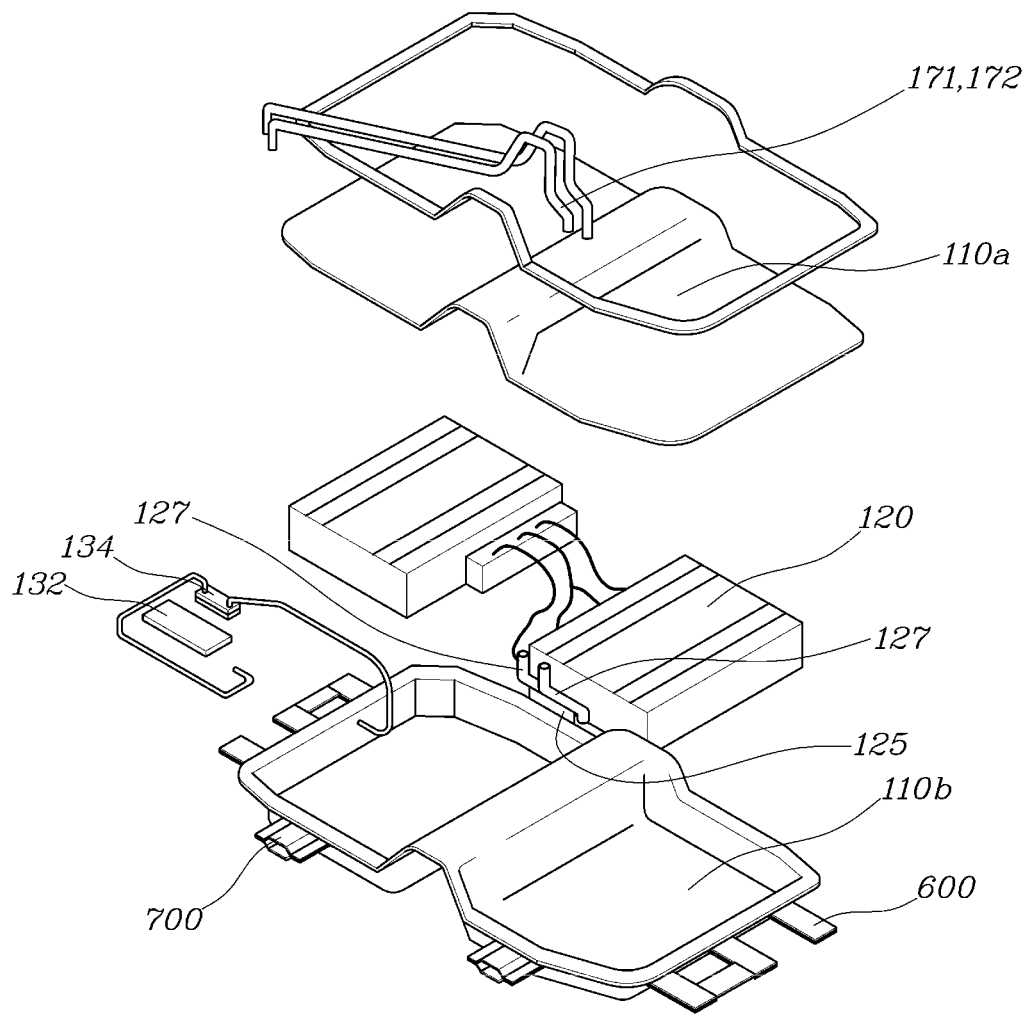
FIG. 7 is an exploded perspective view of the battery unit according to an embodiment of the present disclosure.
Figure 8:
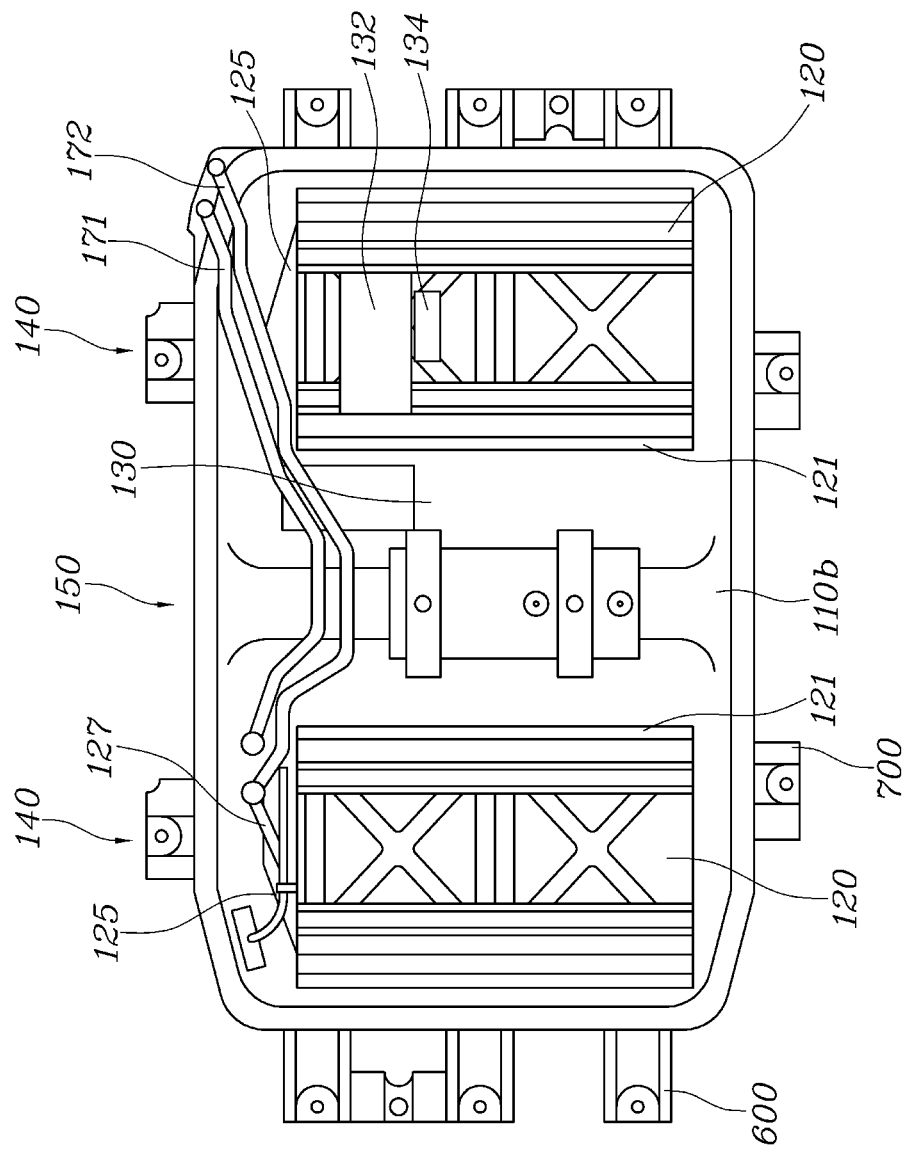
FIG. 8 is a plan view illustrating the battery unit according to an embodiment of the present disclosure in a state where an upper case is removed therefrom.
Figure 9:
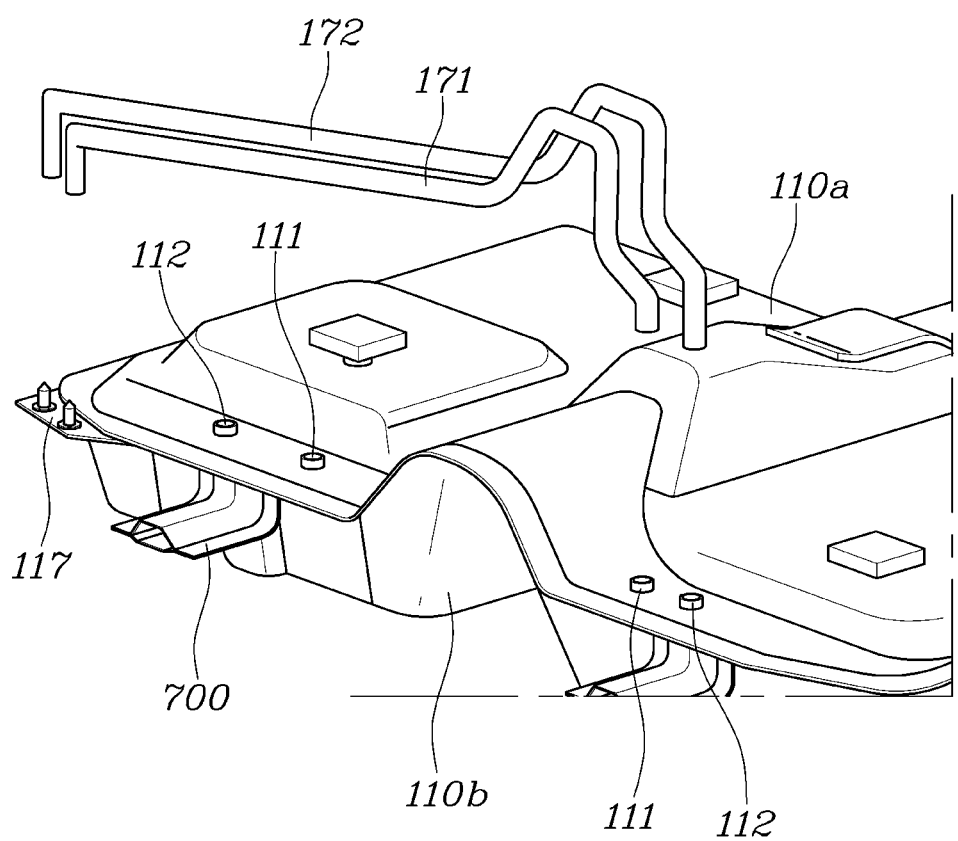
FIG. 9 is an exploded perspective view illustrating the battery unit according to an embodiment of the present disclosure in a state where coolant hoses are disassembled therefrom.
Figure 10:
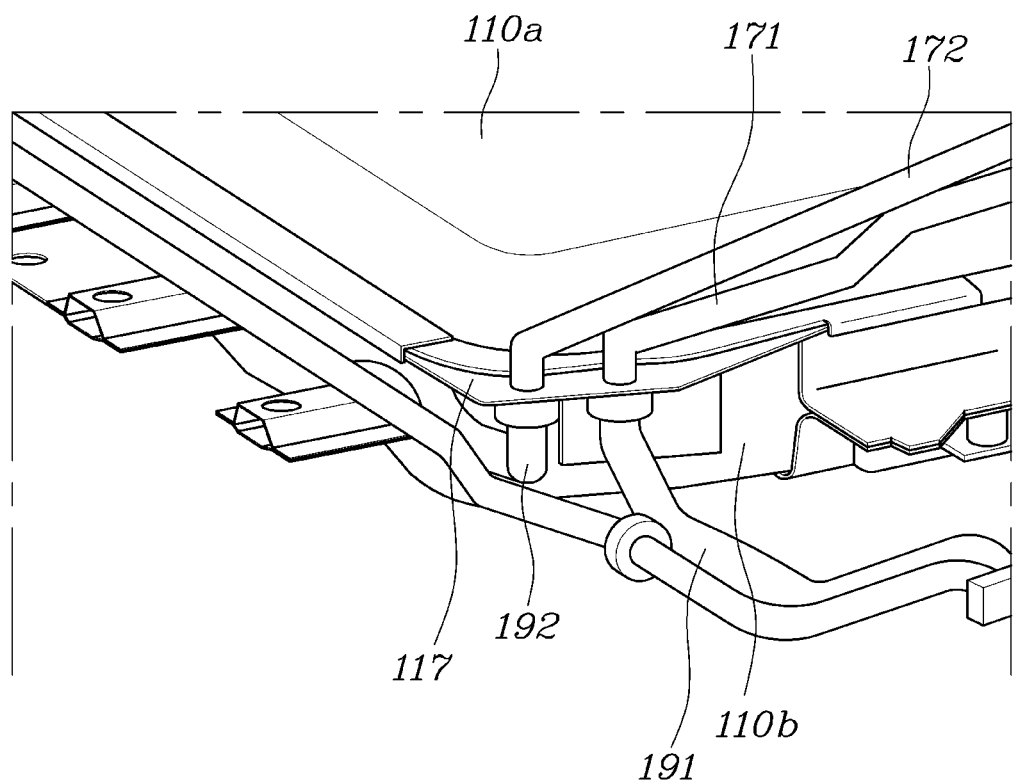
FIG. 10 is a perspective view illustrating hose connection portions of the battery unit according to an embodiment of the present disclosure in more detail.
Figure 11:
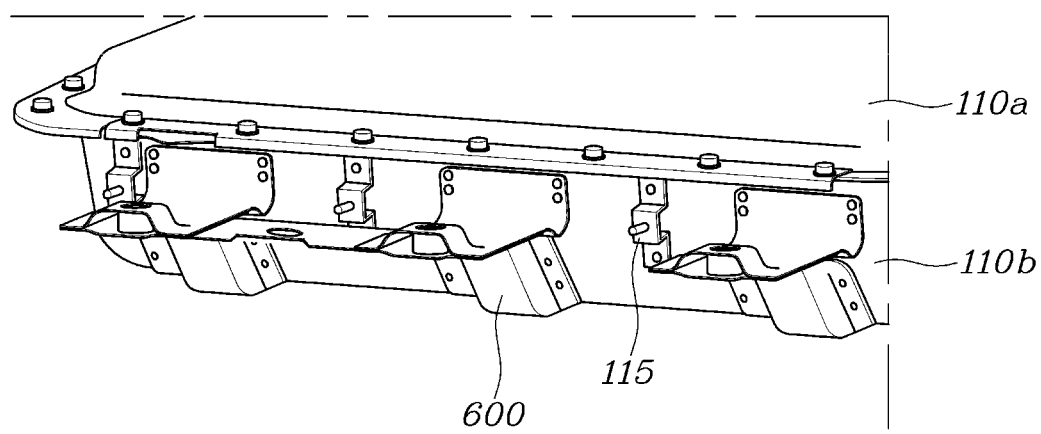
FIGS. 11 and 12 are perspective and side views, respectively, illustrating a side surface portion of the battery unit according to an embodiment of the present disclosure.
Figure 12:
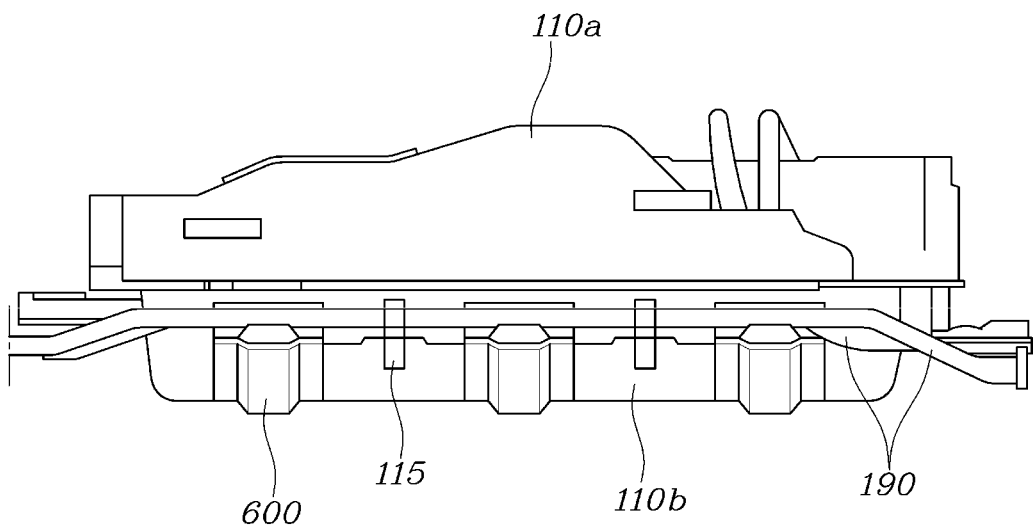
Figure 13:
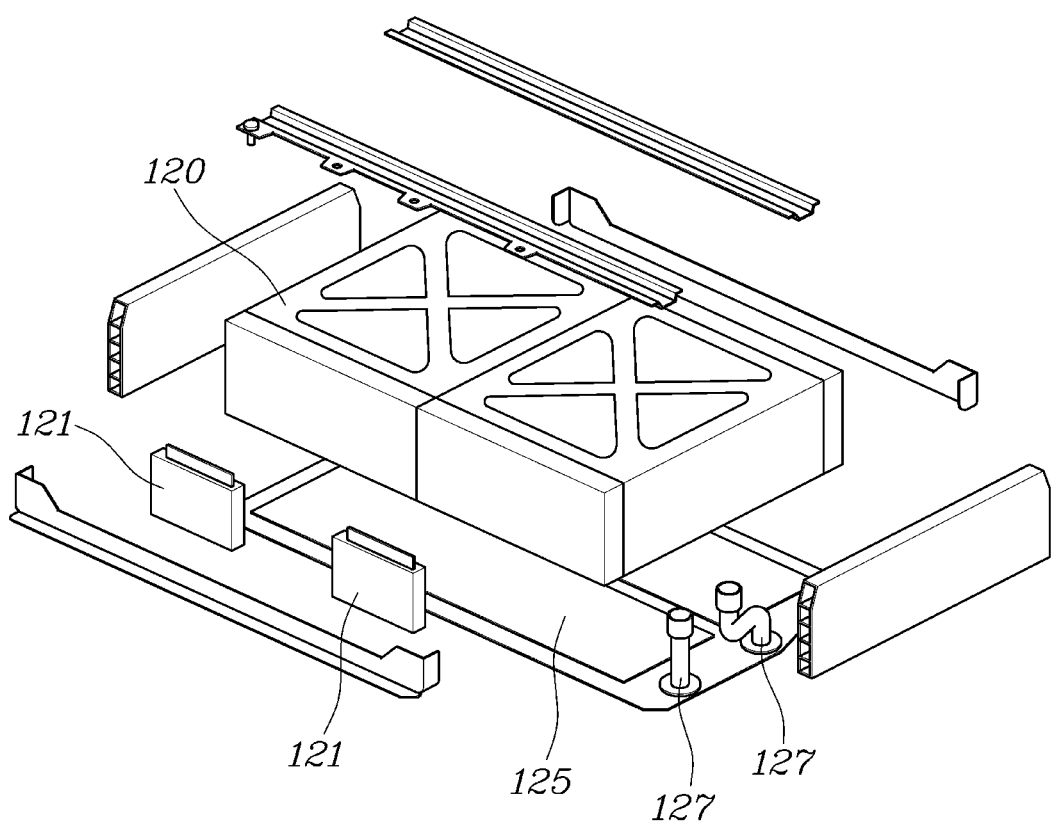
FIG. 13 is an exploded perspective view illustrating an arrangement structure of a battery module, a cell management unit, and a cooling block in the battery unit according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a battery unit for a vehicle according to various exemplary embodiments of the present disclosure and an underbody of the vehicle including the same will be described in detail with reference to the accompanying drawings.

First of all, a battery unit according to an exemplary embodiment of the present disclosure and an installation structure of the battery unit will be described with reference to FIGS. 1 to 12.

Referring to FIGS. 1 to 12, the battery unit according to an exemplary embodiment of the present disclosure may be fixedly disposed under a center floor 210 of the vehicle, and configured to allow a propeller shaft 320 constituting a driving device 300 of the vehicle to pass through the battery unit 100 in a front-rear direction of the vehicle so that power may be transmitted to a rear wheel 230.

The battery unit 100 according to an exemplary embodiment of the present disclosure may include a battery case having an upper case 110a and a lower case 110b forming a sealed internal space, battery modules 120 fixedly installed in the sealed internal space of the battery case, a relay unit 130 for forming or blocking an electrical connection between the battery unit 100 and another system of the vehicle, a battery management system (BMS) 132 configured to monitor and manage voltages, currents, temperatures, and the like of the battery modules 120 or battery cells in the battery modules 120, and a fuse 134 blocking an electrical connection between the two battery modules when an overcurrent occurs.

The lower case 110b of the battery unit 100 according to an exemplary embodiment of the present disclosure may be divided into two battery compartments 140 disposed in a direction toward opposite sides of the vehicle, respectively, such that the battery modules 120 are accommodated therein, and a connecting portion 150 bent to be convex upwardly between the battery compartments 140 to connect the two battery compartments 140 to each other. The upper case 110a may cover an upper side of the lower case 110b, thereby forming a sealed internal space. The upper case 110a may be formed to have a shape corresponding to an upper end shape of the lower case 110b. The battery module 120 may include a plurality of battery cells electrically connected to each other. A voltage of the battery module 120 may be determined based on whether the plurality of battery cells included therein are connected to each other in series or in parallel.

In various exemplary embodiments of the present disclosure, the two battery modules 120 are arranged in the two battery compartments 140 spatially separated from each other by the connecting portion 150, respectively, and the relay unit 130, the BMS 132, and the fuse 134 are installed in one of the two battery compartments 140. Accordingly, high voltage power wires connected to a first of the battery modules 120 installed in one of the battery compartments 140 need to extend to a second one of the battery compartments 140. In particular, the wires may be arranged along the connecting portion 150 connecting the two battery compartments 140 to each other.

Meanwhile, the battery unit 100 is fixedly installed under the center floor 210 of the vehicle outside the vehicle, and the center floor 210 may have a center tunnel 211 protruding upwardly, bent, and extending in the front-rear direction of the vehicle. The battery unit 100 may be installed such that the above-described battery compartments 140 of the battery unit 100 are positioned on the left and right sides of the center tunnel 211, respectively. In addition, the connecting portion 150 may be bent to protrude upwardly, like the center tunnel 211 of the center floor 210, so that the battery unit 100 may be installed under the center floor 210 of the vehicle in a state where the connecting portion 150 is inserted into the center tunnel 211.

In other words, the connecting portion 150, which is a portion protruding upwardly while connecting upper sides of the battery compartments 140 positioned on both sides of the vehicle with respect to the center tunnel 211, may be indented along the center tunnel 211. In addition, an installation space 160 that is open in the front-rear direction of the vehicle may be formed under the connecting portion 150 between the two battery compartments 140.

In an exemplary embodiment of the present disclosure, the propeller shaft 320 forming the driving device 300 of the vehicle may be disposed in the installation space 160. In other words, in the battery unit 100 according to an exemplary embodiment of the present disclosure, since the installation space 160 is formed under the case, even when the battery unit 100 is installed under the center floor 210 of the vehicle, it is possible to secure a space for disposing the propeller shaft 320 transmitting power from a power train 310, which is positioned at the front of the vehicle, to the rear wheel.

Meanwhile, the battery unit 100 according to an exemplary embodiment of the present disclosure may include a cooling device for cooling the battery module 120 disposed in the battery compartment 140. First, in the battery unit 100 according to an exemplary embodiment of the present disclosure, a cooling block 125 may be disposed under the battery module 120 to exchange heat with the battery module 120 in surface contact, thereby cooling the battery module 120. One cooling block 125 may be disposed in each of the two battery compartments 140.

Additionally, coolant may be introduced into and discharged from the cooling block 125, such that the cooling block 125 exhibits a desired level of cooling performance. Accordingly, the battery unit 100 according to an exemplary embodiment of the present disclosure may include a first hose 171 and a second hose 172 for introducing the coolant into the cooling block 125 and discharging the coolant from the cooling block 125. The first hose 171 is a hose through which the coolant is introduced from the outside, and may be connected to a coolant inlet port 111 formed in the upper case 110a of the battery unit 100. In addition, the second hose 172 is a hose through which the coolant is discharged from the cooling block 125, and may be connected to a coolant outlet port 112 formed in the upper case 110a of the battery unit 100, like the first hose 171.

First ends of inner hoses 127 communicating with the cooling block 125 may be positioned in the coolant inlet port 111 and the coolant outlet port 112, respectively, and the first ends of the inner hoses 127 may allow the coolant inlet port 111 and the coolant outlet port 112 to communicate with the first hose 171 and the second hose 172, respectively. One coolant inlet port 111 and one coolant outlet port 112 are formed in respective areas corresponding to each of the two battery compartments 140 positioned under the upper case 110a, so that the coolant may be introduced into and discharged from the cooling block 125 disposed in each of the battery compartments 140.

The lower case 110b may include hose fixers 117 to which first ends of the first hose 171 and the second hose 172 are fixed, respectively, outside an area covered by the upper case 110a. Preferably, the hose fixers 117 may be formed at one corner portion of the lower case 110b corresponding to a height at which the lower case 110b is in contact with the upper case 110a. At the hose fixers 117, the first hose 171 may be connected to a coolant introducing hose 191 through which the coolant is introduced from another component of the vehicle, and the second hose 172 may be connected to a coolant discharging hose 192 for supplying the coolant to another component of the vehicle.

For example, in a coolant circulation path in the vehicle, the coolant may be introduced through the coolant introducing hose 191 from a chiller for cooling the coolant to decrease a temperature of the coolant, and the coolant introduced from the chiller may be provided to the first hose 171 fixedly connected to the coolant introducing hose 191 at the hose fixer 117. In addition, the coolant discharged from the cooling block 125 in the battery unit 100 through the second hose 172 may be supplied to a charger mounted on the vehicle for charging the battery module 120 in the battery unit 100 through the coolant discharging hose 192 fixedly connected to the second hose 172 at the hose fixer 117.

The battery unit 100 according to an exemplary embodiment of the present disclosure may include a bracket 115 for fixing a hose through which the coolant flows. The bracket 115 may be attached to an outer side surface of the lower case 110b, and used for the purpose of fixing the coolant hose positioned around the battery unit 100 in a clip.

The lower case 110b may further include at least one member 600 fixed to an area from a bottom surface to the outer side surface thereof to fix the battery unit under the vehicle. The fixed structure of the battery unit through the member 600 will be described in more detail later. In an exemplary embodiment of the present disclosure, the bracket 115 may be located such that the coolant hose fixed to the bracket 115 is disposed at a position higher than the uppermost end of the member 600. This is to minimally expose the fixed hose to a lower side surface of the vehicle, considering the vehicle marketability in relation to the outer appearance of the vehicle.

Meanwhile, a cell management unit 121 configured to monitor and manage a voltage or a temperature of a battery cell (not shown) included in the battery module 120 may be disposed on one side surface of the battery module 120 provided in the battery unit according to an exemplary embodiment of the present disclosure. The cell management unit 121 is preferably disposed to face the connection portion.

In addition, the battery unit 100 according to an exemplary embodiment of the present disclosure may further include a relay unit 130 for forming or blocking an electrical connection between the battery unit 100 and another system of the vehicle. The relay unit 130 is a vehicle component including a plurality of relays, which is commonly collectively referred to as a power relay assembly (PRA), and forming or blocking an electrical connection between a high voltage battery storing power for driving a vehicle motor and a vehicle system in an electrically driven vehicle. When the vehicle is turned on according to a driver's input, the relay unit 130 may be configured to operate to form the electrical connection between the battery unit 100 and the vehicle system. When the vehicle system needs to be shut down according to a driver's input or a controller's determination due to an accident or the like, the relay unit 130 may block the electrical connection between the battery unit 100 and the vehicle system. Preferably, the relay unit 130 may be disposed in one of the battery compartments between the battery module 120 and the connecting portion 150.

As described above, the cell management unit 121 and the relay unit 130 are preferably disposed between the battery module 120 and the connecting portion 150. This is to protect the cell management unit 121 and the relay unit 130 from being directly affected by an external shock when the external shock occurs, and to minimize the contact of the cell management unit 121 and the relay unit 130 with the coolant when the coolant is leaked. In addition, the battery unit 100 according to an exemplary embodiment of the present disclosure may further include a battery management unit 132 (also referred to as a battery management system (BMS)) configured to monitor and manage a current, a voltage, or a temperature of the battery unit 100 and a fuse 134 blocking an electrical connection between the two battery modules when an overcurrent occurs. The battery management unit 132 and the fuse 134 are preferably disposed on the battery module 120 disposed in one of the battery compartments 140 to minimize an increase in volume of the battery unit 100.

Figure 14:
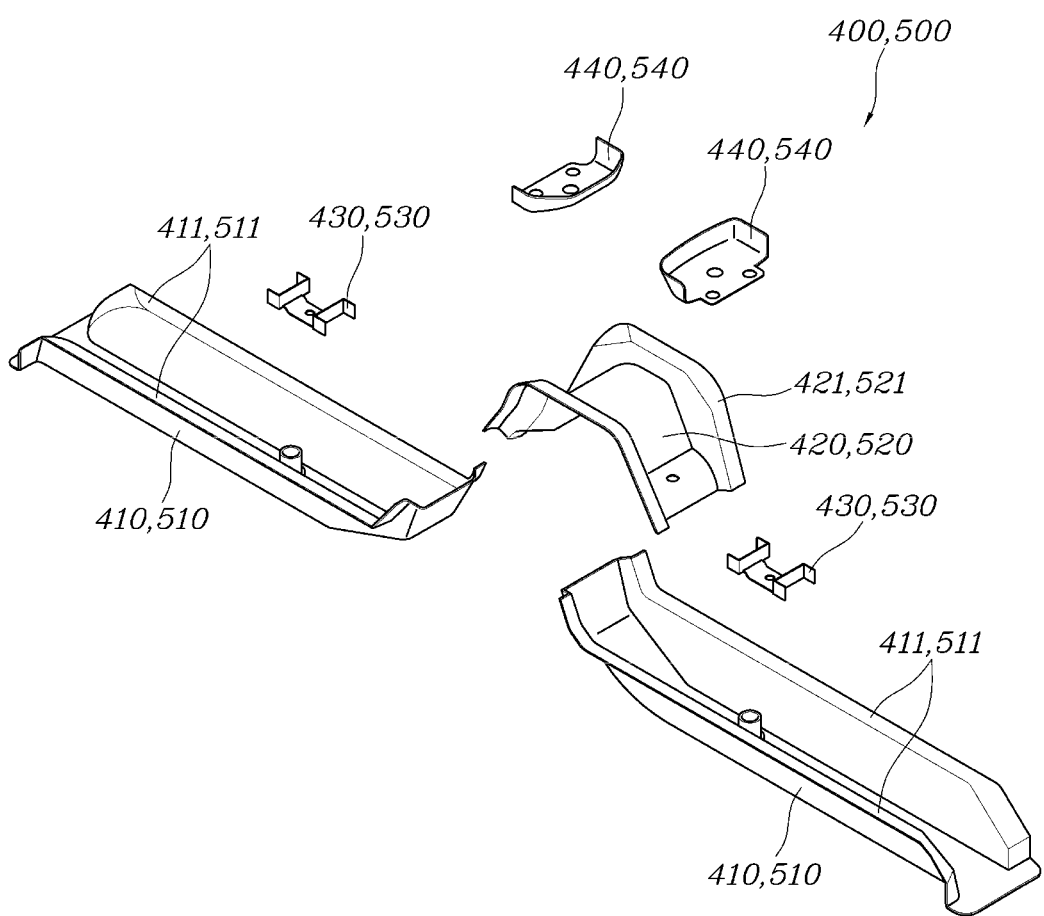
FIG. 14 is an exploded perspective view of a front cross member and a rear cross member provided in an underbody of the vehicle according to an embodiment of the present disclosure.
Figure 15:
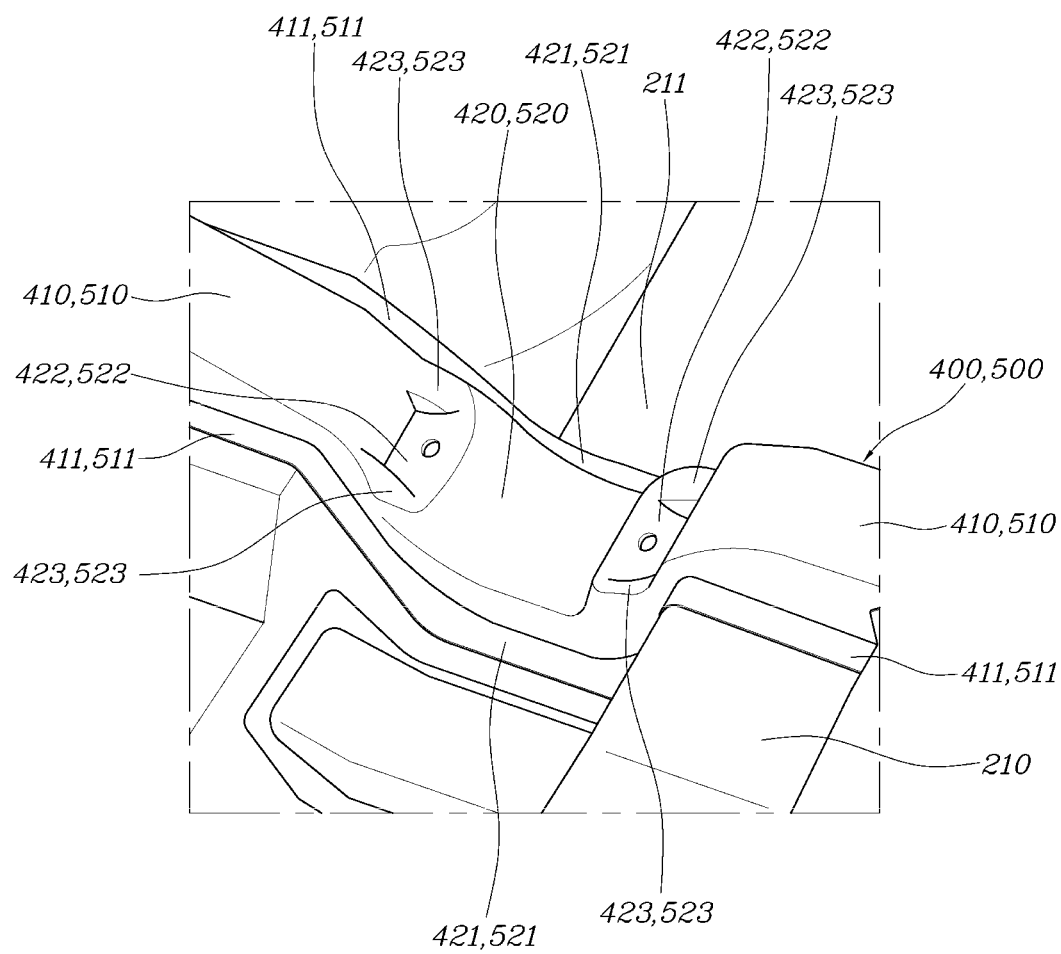
FIG. 15 is a bottom perspective view illustrating a state where the front cross member and the rear cross member are coupled to a center floor in the underbody of the vehicle according to an embodiment of the present disclosure.
Figure 16:
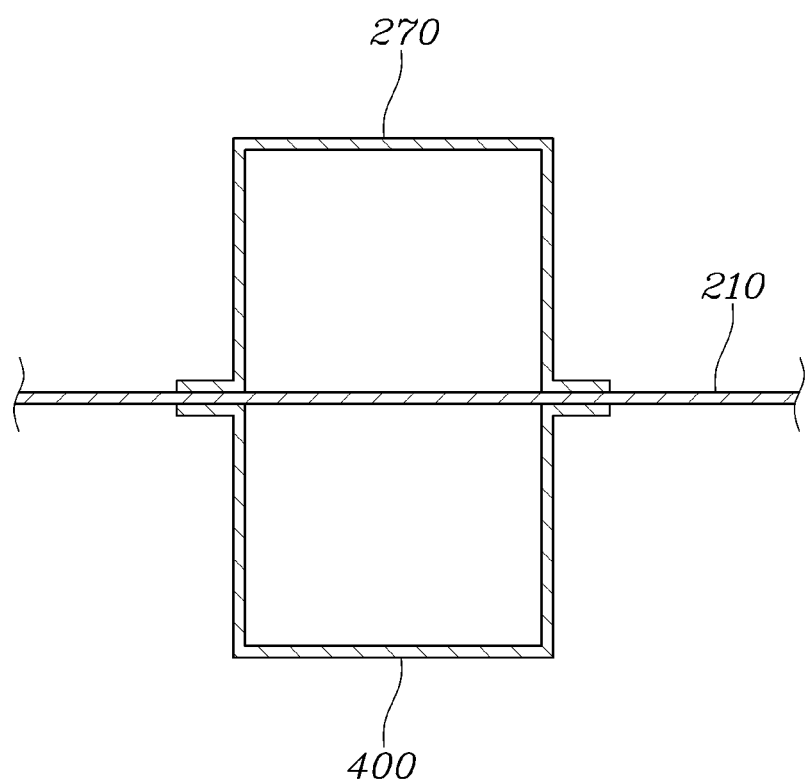
FIGS. 16 and 17 are views for explaining examples of a coupled structure of the front cross member and a seat cross member in the underbody of the vehicle according to an embodiment of the present disclosure.
Figure 17:
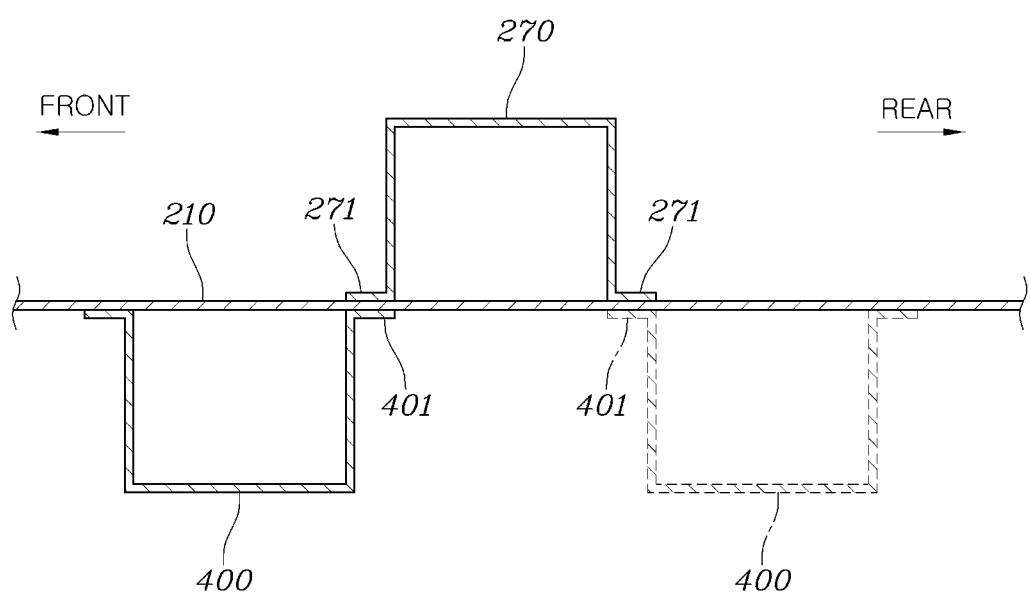

Next, an underbody of the vehicle according to an exemplary embodiment of the present disclosure will be described with reference to all the remaining drawings. FIG. 14 is an exploded perspective view of a front cross member and a rear cross member provided in an underbody of the vehicle according to an embodiment of the present disclosure, FIG. 15 is a bottom perspective view illustrating a state where the front cross member and the rear cross member are coupled to the center floor in the underbody of the vehicle according to an embodiment of the present disclosure, and FIGS. 16 and 17 are views for explaining examples of a coupled structure of the front cross member and the seat cross member in the underbody of the vehicle according to an embodiment of the present disclosure.

The driving device 300 of the vehicle may include a power train 310 having an engine and a motor, and a propeller shaft 320 configured to transmit power from the power train 310. The power train 310 may be fixedly installed on a sub-frame 220 positioned at the front of the vehicle, and the propeller shaft 320 may be disposed to extend in the front-rear direction of the vehicle, with one end (e.g., a first end) thereof being connected to the power train 310. As described above, the propeller shaft 320 may be disposed in the installation space 160 under the connecting portion 150 of the battery unit 100. Although not illustrated, an exhaust pipe extending from the power train 310 to the rear of the vehicle may also be disposed in the installation space 160.

As already known in the related art, the propeller shaft 320 of the vehicle is a component for transmitting power from the power train 310 to the rear wheel 230. Since the power generated from the power train 310 is transmitted to the rear wheel 230 through the propeller shaft 320, the rear wheel 203 may be driven by the power of the power train 310 mounted at the front of the vehicle. Since the battery unit 100 is installed under the center floor 210, a front cross member 400 and a rear cross member 500 are fixedly installed under the center floor 210 at the front and the rear of the battery unit 100, respectively.

Both the front cross member 400 and the rear cross member 500 may be structures extending in a direction toward the opposite sides of the vehicle, with both ends thereof being connected to side sills 240 positioned on the left and right sides of the vehicle, respectively, thereby forming load paths toward the side sills 240. In addition, the front cross member 400 may be connected to rear ends of front side members 250 to form load paths for transmitting a load to the front side members 250, and the rear cross member 500 may be connected to front ends of rear side members 260 to form load paths for transmitting a load to the rear side members 260. Since both the front cross member 400 and the rear cross member 500 are connected to vehicle body structures (e.g., the center floor, the side sills, the front side members, and rear side members), it is possible to increase a rigidity of a vehicle body, thereby improving ride and handling (R&H) performance and noise, vibration, and harshness (NVH) performance of the vehicle.

Since the battery unit 100, which is positioned under the center floor 210 outside the vehicle, is installed such that an outer perimeter thereof is surrounded by the side sills 240 positioned on the opposite sides and the front cross member 400 and the rear cross member 500 positioned on the front and rear sides, the installation position of the battery unit 100 may be regulated by the side sills 240 positioned on the opposite sides and the front cross member 400 and the rear cross member 500 positioned on the front and rear sides, and furthermore, the battery unit 100 may be sufficiently protected against impacts from the front, rear, and lateral sides of the vehicle.

The propeller shaft 320 of the driving device 300, which is disposed to pass through the installation space 160 under the connecting portion 150, may be mounted on at least one of the front cross member 400, the rear cross member 500, and the battery unit 100 to have a strong coupling force. A seat cross member 270 may be coupled on the center floor 210 while being disposed in the left-right direction, and the front cross member 400 may be disposed to vertically overlap the seat cross member 270 with the center floor 210 interposed therebetween. The vertical overlapping structure of the seat cross member 270 and the front cross member 400 makes it possible to secure further improved durability, thereby further enhancing the stiffness and the rigidity of the vehicle body.

As another example, the front cross member 400 may be connected to the seat cross member 270 through flanges 271 and 401, with the center floor 210 interposed therebetween, while being disposed in front of or behind the seat cross member 270. Each of the front cross member 400 and the rear cross member 500 includes two side parts 410 or 510 and a connection part 420 or 520 connecting the two side parts 410 or 510.

The side part 410 or 510 may be formed in an approximately straight shape with a U-shaped cross section, and the connection part 420 or 520 may be formed in a tunnel shape to be convex upwardly with a U-shaped cross section like the side part 410 or 510. The connection part 420 or 520 is installed to be inserted into the center tunnel 211 of the center floor 210. All outward ends of the side parts 410 and 510 may be connected to the side sills 240 of the vehicle to form load paths in a direction toward the opposite sides, and inward ends of the side parts 410 and 510 may be coupled to opposite ends of the connection parts 420 and 520 to overlap each other, thereby maintaining a strong coupling force.

All of the side parts 410 and 510 and the connection parts 420 and 520 are upwardly open due to the U-shaped cross section thereof, and flanges 411, 421, 511, and 521 of the upwardly open portions may be coupled to a lower surface of the center floor 210 in surface contact. Accordingly, the center floor 210, the side sills 240, the side parts 410 and 510, and the connection parts 420 and 520 form sealed closed spaces 280 therebetween. The sealed closed spaces 280 make it possible to further enhance the stiffness and the rigidity of the vehicle body.

The connection part 420 or 520 has coupling surfaces 422 or 522 formed at both ends thereof for the propeller shaft 320 to be coupled thereto, and beads 423 or 523 are formed on both sides of the coupling surfaces 422 or 522 for the side parts 410 or 510 to be connected thereto. The coupling surfaces 422 or 522 are preferably formed to be plane to enhance a coupling force between the connection part 420 or 520 and the propeller shaft 320, but are not limited thereto. The coupling surfaces 422 or 522 may be formed in the same shape as the mounting surface of the propeller shaft 320 such that the connection part 420 or 520 and the propeller shaft 320 may be coupled to each other through surface contact.

In addition, the beads 423 or 523 formed on the connection part 420 or 520 are formed to be connected up to the side parts 410 or 510. Through the beads 423 and 523, it is possible to further enhance the rigidity of the coupled portions between the connection part 420 or 520 and the side parts 410 or 510. A first reinforcing bracket 430 or 530 is coupled to an inner surface of each of the side parts 410 or 510. The first reinforcing bracket 430 coupled to the side part 410 of the front cross member 400 is coupled to a front end of a longitudinal member 700 to be described later, and the first reinforcing bracket 530 coupled to the side part 510 of the rear cross member 500 is coupled to a rear end of the longitudinal member 700 to be described later.

Since the first reinforcing brackets 430 and 530 are coupled to a portion where the front cross member 400 and the longitudinal member 700 are coupled to each other and a portion where the rear cross member 500 and the longitudinal member 700 are coupled to each other, respectively, it is possible to further enhance the rigidity of the coupled portions. A second reinforcing bracket 440 or 540 for reinforcing the rigidity of the coupled portion is coupled to each of the coupling surfaces 422 or 522 of the connection part 420 or 520 to which the propeller shaft 320 is coupled.

The battery unit 100, which is installed under the center floor 210 outside the vehicle, is supported on the lower side thereof and connected to vehicle body structures by a plurality of transverse members 600 and a plurality of longitudinal members 700. In other words, in the battery unit 100, the plurality of transverse members 600 extending in the left-right direction and spaced apart from each other in the front-rear direction are coupled to the lower surfaces of the battery compartments 140, and the longitudinal members 700 extending in the front-rear direction are coupled to the lower surfaces of the battery compartments 140 such that one longitudinal member 700 is positioned for each of the battery compartments 140. In addition, the battery unit 100 may further include a connecting portion reinforcing member 800 indented and coupled into the connecting portion 150 while extending in the front-rear direction along the installation space 160.

The transverse member 600 may be installed across the longitudinal member 700. In particular, a first end of the transverse member 600 is connected to the side sill 240 of the vehicle and a second end of the transverse member 600 is connected to the connecting portion reinforcing member 800 to form a load path in a direction toward the side of the vehicle. In addition, since the transverse member 600 is connected to the longitudinal member 700, it is also possible to form a load path in the front-rear direction.

As another example, the transverse members 600 may be positioned on the left and right sides of the longitudinal member 700, respectively, such that first ends of the transverse members 600 are connected to the left and right sides of the longitudinal member 700, respectively, and second ends of the transverse members 600, which are not connected to the longitudinal member 700, are connected to the side sill 240 and the connecting portion reinforcing member 800, respectively. In this structure, the transverse member 600 and the longitudinal member 700 do not vertically overlap each other, resulting in an advantage that it is possible to reduce a vertical height as compared with that when the members vertically overlap each other.

Each of the side sills 240 positioned on the left and right sides of the vehicle includes an upper surface 241, a lower surface 242, and a side surface 243 when viewed in its longitudinal section, and the left and right ends of the center floor 210 are connected to the side surfaces 243 of the side sills 240, respectively. Accordingly, an accommodation space 290 that is open downwardly may be formed under the center floor 210 by the lower surface of the center floor 210 and the side surface 243 of the side sill 240.

The battery compartment 140 of the battery unit 100 is installed in the accommodation space 290, such that an upper portion of the battery compartment 140 is accommodated in the accommodation space 290, and a lower portion of the battery compartment 140 protrudes downwardly beyond the side sill 240. This installation structure of the battery compartment 140 makes it possible to dispose not only lower the center floor 210 as close to the ground as possible, thereby securing a sufficient indoor space, but also dispose most of the upper portion of the battery compartment 140 in the accommodation space 290, thereby spacing the battery compartment 140 apart from a road surface at a sufficient distance.

The battery unit for the vehicle and the underbody of the vehicle including the same are advantageous in terms of marketability in that the battery unit is fixedly installed under the center floor outside the vehicle, thereby making it possible to maximally use a trunk or luggage compartment. Particularly, the battery unit for the vehicle and the underbody of the vehicle including the same are advantageous in terms of vehicle manufacturing cost, weight, and fuel efficiency in that, while the battery unit is installed under the center floor, the battery unit secures a space for installing the propeller shaft forming the driving device of the vehicle to transmit power to the rear wheel, thereby implementing a four-wheel drive without using a separate motor for driving the rear wheel.

Further, the battery unit for the vehicle and the underbody of the vehicle including the same are advantageous in that the battery unit installed under the center floor is connected to vehicle body structures, such as the side sills, the front side members, and the rear side members, through the transverse members, the longitudinal members, the front cross member, the rear cross member, and the like, thereby enhancing the rigidity of the vehicle body and improving ride and handling (R&H) performance and noise, vibration, and harshness (NVH) performance of the vehicle. In addition, the battery unit for the vehicle and the underbody of the vehicle including the same are advantageous in that a water cooling system is applied, thereby improving cooling performance and noise reducing performance as compared with those in an air cooling system.

The effects obtainable from the present disclosure are not limited to the above-mentioned ones, and other effects that are not mentioned above may be clearly understood from the description above by those having ordinary knowledge in the field of technology to which the present disclosure pertains.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A battery unit for a vehicle, comprising:
a lower case having two battery compartments arranged in a direction toward opposite sides of the vehicle, respectively, and a connecting portion bent to be convex upwardly between the two battery compartments;
battery modules installed in the two battery compartments, respectively;
a cooling block disposed under each of the battery modules and configured to receive and discharge coolant to cool the battery module;
an upper case installed on the lower case and having a coolant inlet port through which the coolant is supplied to the cooling block and a coolant outlet port through which the coolant is discharged from the cooling block; and
at least one member fixed to an area from a bottom surface to an outer side surface of the lower case to fix the battery unit under the vehicle,
wherein the lower case includes at least one bracket for fixing a hose through which the coolant flows on the outer side surface of the lower case, and
wherein the hose fixed to the bracket is disposed at a position higher than an uppermost end of the at least one member.

2. The battery unit of claim 1, wherein one coolant inlet port is formed in an area corresponding to each of the two battery compartments, and one coolant outlet port is formed in an area corresponding to each of the two battery compartments.

3. The battery unit of claim 1, further comprising a first hose connected to the coolant inlet port formed in the upper case and a second hose connected to the coolant outlet port formed in the upper case.

4. The battery unit of claim 3, wherein the lower case further includes hose fixers to which first ends of the first hose and the second hose are fixed, respectively, outside of an area covered by the upper case.

5. The battery unit of claim 4, wherein at the hose fixers, the first hose is connected to a coolant introducing hose through which the coolant is introduced from another component in the vehicle, and the second hose is connected to a coolant discharging hose through which the coolant is discharged to another component in the vehicle.

6. The battery unit of claim 1, wherein a cell management unit configured to monitor and manage a voltage or a temperature of a battery cell included in each of the two battery modules is disposed on one side surface of one of the battery modules, and the one of the battery modules is disposed such that the cell management unit faces the connecting portion.

7. The battery unit of claim 1, further comprising a relay unit disposed between the one of the battery modules disposed in one of the battery compartments and the connecting portion to form or block an electrical connection between the battery unit and another system of the vehicle.

8. A battery unit for a vehicle, comprising:
a lower case having two battery compartments arranged in a direction toward opposite sides of the vehicle, respectively, and a connecting portion bent to be convex upwardly between the two battery compartments;
battery modules installed in the two battery compartments, respectively;
a cooling block disposed under each of the battery modules and configured to receive and discharge coolant to cool the battery module;
an upper case installed on the lower case and having a coolant inlet port through which the coolant is supplied to the cooling block and a coolant outlet port through which the coolant is discharged from the cooling block; and
a battery management unit configured to monitor and manage a current, a voltage, or a temperature of the battery unit and a fuse blocking an electrical connection between the two battery modules when an overcurrent occurs, wherein the battery management unit and the fuse are disposed on the battery module disposed in one of the battery compartments.

9. An underbody of a vehicle, comprising:
a center floor of the vehicle; and
a battery unit including:
a lower case disposed under the center floor, having two battery compartments arranged in a direction toward opposite sides of the vehicle, respectively, and a connecting portion bent to be convex upwardly between the two battery compartments, and forming an installation space under the connecting portion between the two battery compartments;

battery modules installed in the two battery compartments, respectively;

a cooling block disposed under each of the battery modules and configured to receive and discharge coolant to cool the battery modules; and an upper case installed on the lower case and having a coolant inlet port through which the coolant is supplied to the cooling block and a coolant outlet port through which the coolant is discharged from the cooling block, wherein a propeller shaft of the vehicle is disposed in the installation space, wherein the lower case includes at least one bracket for fixing a hose through which the coolant flows on an outer side surface thereof, and wherein the battery unit further includes at least one member fixed to an area from a bottom surface to the outer side surface of the lower case to fix the battery unit under the vehicle, and the hose fixed to the bracket is disposed at a position higher than an uppermost end of the at least one member.

10. The underbody of claim 9, wherein one coolant inlet port is formed in an area corresponding to each of the battery compartments, and one coolant outlet port is formed in an area corresponding to each of the battery compartments.

11. The underbody of claim 9, wherein the battery unit further includes a first hose connected to the coolant inlet port formed in the upper case and a second hose connected to the coolant outlet port formed in the upper case.

12. The underbody of claim 11, wherein the lower case further includes hose fixers to which first ends of the first hose and the second hose are fixed, respectively, outside an area covered by the upper case.

13. The underbody of claim 12, wherein at the hose fixers, the first hose is connected to a coolant introducing hose through which the coolant is introduced from another component in the vehicle, and the second hose is connected to a coolant discharging hose through which the coolant is discharged to another component in the vehicle.

14. The underbody of claim 9, wherein a cell management unit configured to manage and monitor a voltage or a temperature of a battery cell included in each of the battery modules is disposed on one side surface of one of the battery modules, and the one of the battery modules is disposed such that the cell management unit faces the connecting portion.

15. The underbody of claim 9, wherein the battery unit further includes a relay unit disposed between the one of the battery modules disposed in one of the battery compartments and the connecting portion to form or block an electrical connection between the battery unit and another system of the vehicle.

16. An underbody of a vehicle, comprising:
a center floor of the vehicle; and
a battery unit including:
a lower case disposed under the center floor, having two battery compartments arranged in a direction toward opposite sides of the vehicle, respectively, and a connecting portion bent to be convex upwardly between the two battery compartments, and forming an installation space under the connecting portion between the two battery compartments;
battery modules installed in the two battery compartments, respectively;
a cooling block disposed under each of the battery modules and configured to receive and discharge coolant to cool the battery modules;
an upper case installed on the lower case and having a coolant inlet port through which the coolant is supplied to the cooling block and a coolant outlet port through which the coolant is discharged from the cooling block, wherein a propeller shaft of the vehicle is disposed in the installation space; and
a battery management unit configured to monitor and manage a current, a voltage, or a temperature of the battery unit and a fuse blocking an electrical connection between the battery modules when an overcurrent occurs, and the battery management unit and the fuse are disposed on the one of the battery modules disposed in one of the battery compartments.

* * * * *